United States Patent [19]

Häusler et al.

[11] Patent Number: 4,489,564
[45] Date of Patent: Dec. 25, 1984

[54] HYDRIDE STORAGE FOR HYDROGEN

[75] Inventors: Peter Häusler, Hattingen; Norbert Nathrath, Bottrop, both of Fed. Rep. of Germany

[73] Assignee: Thyssen Industrie AG, Fed. Rep. of Germany

[21] Appl. No.: 488,264

[22] Filed: Apr. 25, 1983

[30] Foreign Application Priority Data

May 6, 1982 [DE] Fed. Rep. of Germany ....... 3216917

[51] Int. Cl.³ ............................................. F17C 11/00
[52] U.S. Cl. ........................................ 62/48; 34/15; 123/553; 206/0.7
[58] Field of Search ................ 62/48; 123/553; 34/15; 206/0.7

[56] References Cited

U.S. PATENT DOCUMENTS

| 3,732,690 | 5/1973 | Meijer | 123/533 |
| 4,135,621 | 1/1979 | Turillon et al. | 62/48 |
| 4,165,569 | 8/1979 | Mackay | 62/48 |
| 4,187,092 | 2/1980 | Woolley | 62/48 |
| 4,383,606 | 5/1983 | Hunter | 206/0.7 |
| 4,393,924 | 7/1983 | Asami et al. | 62/48 |
| 4,396,114 | 8/1983 | Golben et al. | 62/48 |

Primary Examiner—Ronald C. Capossela
Attorney, Agent, or Firm—McGlew & Tuttle

[57] ABSTRACT

A hydride storage for hydrogen comprises a preferably tubular solid casing for the storage material. In the interior of the casing, the storage material is bounded by a wall of a fabric, particularly metallic fabric, through which the hydrogen penetrates into, and out of, the material. Preferably, a highly elastic conduit (tubular body) permeable to gas and made of a metallic fabric is embedded in the storage material.

18 Claims, 3 Drawing Figures

HYDRIDE STORAGE FOR HYDROGEN

FIELD AND BACKGROUND OF THE INVENTION

This invention relates in general to the construction of storage containers and in particular to a new and useful hydride storage for hydrogen.

Depending on the required storage volume, even a plurality of such storages may be combined to a larger unit. Hydrogen as an energy carrier can be stored and shipped either in gaseous or liquid state, or also in the form of a metal hydride. Under normal ambience conditions, hydrogen can be stored in the metal hydride form without problems, safely, and in a small space. In general, the storage material, such as a metal alloy containing titanium, zirconium, chromium, and manganese, in the form of a powder, or of pellets (tablets), is received in elongated tubular casings having frontal and external connections. Most metals combine with hydrogen to metal hydrides, with, as a rule, heat being released if hydrogen is introduced to the metal, and heat being wanted to remove the hydrogen. The released or added heat of reaction must be dissipated from, or introduced into the storage material, depending on the direction of the reaction, as quickly as possible. Moreover, it must be taken into account that during charging of the storage, i.e. adsorption of hydrogen, the storage material expands. To minimize the pressure and/or temperature gradients within the storage material, it is sought to make all portions (partially volumes) of the storage material participate substantially uniformly in the respective reaction during the charging or discharging of the storage.

Up to the present time, this has been achieved only to an unsatisfactory extent with designs where the hydrogen is introduced or removed at one side, particularly at the front end, of an elongated tubular casing (German OS No. 30 22 859).

SUMMARY OF THE CASING

The present invention is directed to providing more satisfactory charging and discharging conditions, and particularly to a design resulting in shorter (mean) paths of flow in a casing volume filled with storage material, and to an improved temperature and pressure distribution.

In accordance with the invention a hydride storage for hydrogen comprises a solid tubular casing in which the storage material is received and which has a first closed end and an opposite second closed end, an external connection connected into said first closed end having a passage for hydrogen flow, a filter in said passage, a casing extending around said tube along its length and defining a boundary between the bottom of the storage material and said space within said casing between said casing wall and said tube where the hydrogen can flow freely, said tube having a wall formed of a fabric which is resistant to hydrogen.

This design makes the volume of the storage material body elastically variable and, advantageously, accelerates the hydrogenation and hydrogen release, while providing an additional filtration.

Fabrics of this kind may be made of a plastic, for example. In such instances, it is advisable to activate the storage material to be hydrogenated, prior to introducing it into the hydride storage casing.

In an advantageous embodiment, the fabric is a metallic fabric. Metal fabrics are temperature resistant and make it possible to activate the storage material in the casing while applying higher temperatures.

The fabric may also take the shape of a sleeve surrounding the storage material and, advantageously, being equipped with a baffle plate at the front end.

In most instances, however, a hydride storage will be preferred having at least one conduit extending from the external connection of the casing and embedded in the storage material. According to claim 4, this conduit may be designed as a tubular body made of said fabric.

To improve the charging and discharging capability in hydride storage elements of larger dimensions, it is advantageous to utilize the fabric both as a sleeve surrounding the storage material, and as a conduit embedded therein.

In a hydride storage of one embodiment, the hydrogen is distributed and passes through the tubular body made of a highly elastic fabric well permeable to gas. Consequently, with usual elongated tubular casings, the hydrogen is introduced into and removed from the storage material substantially only in the radial direction. As the storage material expands during the charging, the tubular body yields accordingly. The result is that the casing walls are less loaded, so that the variations in dimensions may be provided while preserving the same safety as before, and the total weight of the storage structure can be reduced.

It is advisable to make the metallic fabric of stainless steel wire, preferably such having a diameter of 0.04 mm at most.

Metal fabrics may be obtained therefrom having a mesh size of the order of up to 0.04 mm, preferably 0.01 to 0.02 mm. With such a small mesh size, the metallic fabric may in addition function as a filter, since the passage of fine metal particles through the fabric is at least made difficult by apertures of this size.

It has been found particularly advantageous to use as the metallic fabric a braid (lace or galloon) fabric. Such braid fabrics are made of relatively few thick wires in the warp direction, and of many thin wires in the filling direction. They surround the storage material as a sleeve or tubular body exhibiting optimum properties in its stiffness in the longitudinal direction, elasticity in the radial direction, mesh size, and shape of the apertures.

To ensure a satisfactorily stable shape of the tubular body before and after its insertion in the storage material, the body is made from a flat piece of fabric by bending it round and welding in the axial direction. The handling of the tubular body and its securing is simplified by fitting it at its connection end into a bushing and welding it thereto.

For safety reasons, an additional filter may be provided in the inventive hydride storage, in the form of a disc or plate which is inserted along with the bushing in the external connection of the casing. Accordingly, it is an object of the invention to provide an improved hydride storage for hydrogen.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
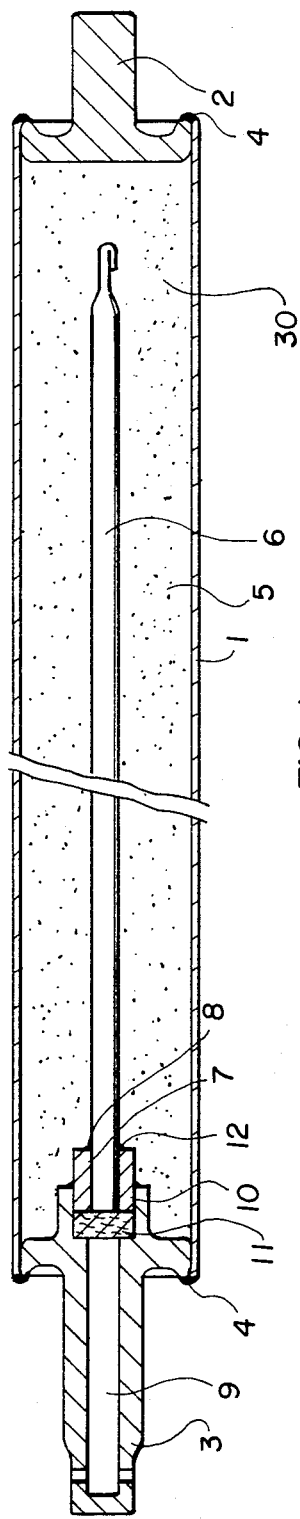
FIG. 1 is a longitudinal sectional view of a hydride storage container constructed in accordance with the invention.

Referring to the drawings, in particular to FIG. 1, the invention embodied therein comprises a hydride storage for hydrogen which comprises a rigid tubular casing or housing 1 which contains a storage material 30 such as a powdery metal and which has one end which is closed by a fitting plug 2 which is welded at 4 and an opposite other end with an external connection 3 and means defining a passage including a step bore 9 and the interior of a metal braid conduit 6 for the hydrogen flow. A filter 10 is in the passage and a space 5 is defined around the passage principally around the conduit 6 and contains the storage material 30. The hydrogen can flow freely into the space 5 and the conduit 6 is formed by a wall of a fabric material which is resistant to hydrogen and preferably a metal fabric and from a stainless steel wire having a particular mesh size.

The hydride storage shown in FIG. 1 comprises a casing in the shape of a cylindrical tube 1 having its open ends closed by a fitting plug 2 and, on the other side, by an external connection 3.

Plug 2 and connection 3 are secured to cylindrical tube 1 on their front edges by welds 4. The interior of this casing is filled with a powdery storage metal 30. Centrally within the storage metal 30, a conduit 6 is provided which is formed by a tubular body of a metallic braid fabric. The metallic fabric is made from stainless steel wire having a maximum diameter of 0.04 mm, and has a mesh size of about 0.01 mm. At the connection side, conduit 6 is fitted into a bushing 7 of a steel resistant to hydrogen, and secured to the front side of the bushing by a circular weld 8.

External connection 3 is provided with a stepped bore 9 having its larger-diameter portion 10 located adjacent inner space 5 of the casing. In this larger portion 10, bushing 7, fitted to conduit 6, is inserted with the interposition of a filter plate 11. Bushing 7 is secured to the inside edge of connection 3 by a circular weld 12.

Figure 2:
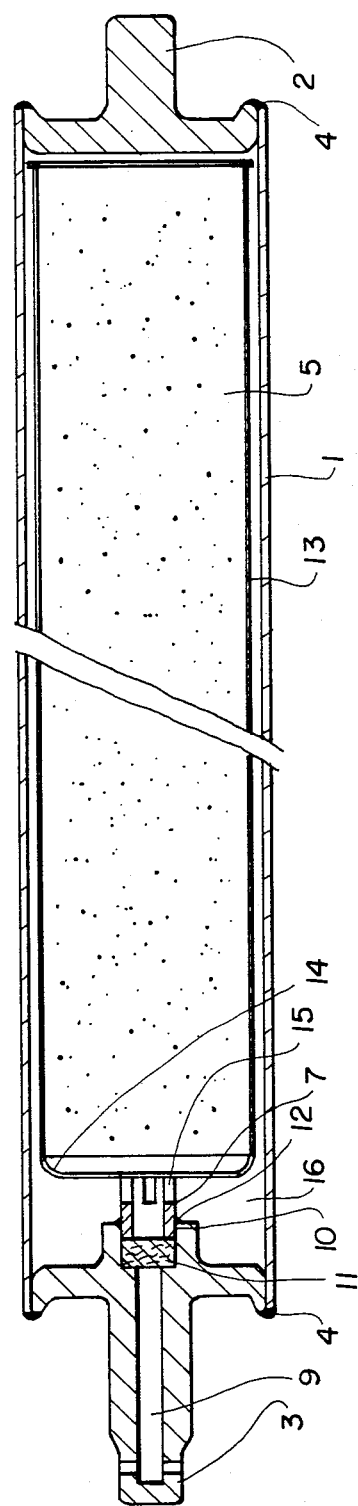
FIG. 2 is a view similar to FIG. 1 of another embodiment.

Filter plate 11 comprises a sintered body of chromium-nickel steel resistant to hydrogen. It is also possible, however, to employ a filter plate of a plastic resistant to hydrogen. The grade of filtration of the filter is 0.01 to 0.02 mm. In the embodiment of FIG. 2, the storage material in the interior 5 of the solid casing (tube 1) of the hydride storage is surrounded by a sleeve 13 of a fabric made from steel wire having a mesh size of about 0.02 mm. At the front side of sleeve 13, a baffle plate 14 is provided. Bushing 7 fitted in connection 3 has three slots 15 providing communication between bore 9 and a vestibule 16. The other reference numerals are the same as in FIG. 1. Sleeve 13 surrounding the storage material is accommodated in casing 1 with only little play, yet without affecting the free flow of hydrogen therearound.

Figure 3:
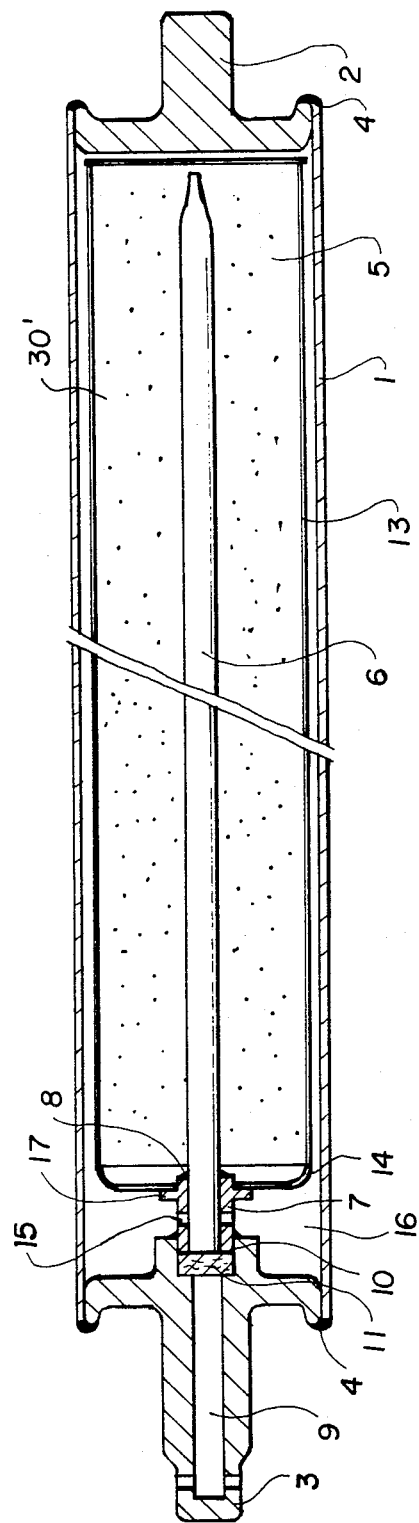
FIG. 3 is a view similar to FIG. 1 of still another embodiment.

In the embodiment of FIG. 3, the metal fabric bounds the storage material both as a surrounding sleeve 13 and as an embedded conduit 6. Conduit 6 is secured to bushing 7 by a circular weld 8; baffle plate 14 is supported on bushing 7 by a flange 17. The introduced hydrogen branches downstream of filter plate 11; one part flows into metal-fabric conduit 6, the other part flows through slots 15 into vestibule 16 and therefrom into the gap between solid casing 1 and sleeve 13. During a discharge the flow is received.

While specific embodiments of the invention have been shown and described in detail to illustrate the application of the principles of the invention, it will be understood that the invention may be embodied otherwise without departing from such principles.

What is claimed is:

1. A hydride storage for hydrogen comprising a rigid tubular housing containing a storage material therein having one closed end and an opposite end with an external connection, means defining a bore in said external connection and into said housing for the flow of hydrogen, a filter in said bore, a flexible fabric material in the form of a tube extending axially in said housing and defining a space communicating with said bore, said fabric material being resistant to hydrogen and bounding one axially extending surface of said storage material so that hydrogen can pass into and out of said storage material and so that said storage material can expand and contract radially into and out of said space.

2. A hydride storage according to claim 1, wherein said fabric material is a metallic fabric.

3. A hydride storage according to claim 2, wherein said metallic fabric is made from stainless steel wire.

4. A hydride storage according to claim 3, wherein said metallic fabric has a mesh size of up to 0.04 mm.

5. A hydride storage according to claim 4, wherein said mesh size is 0.01 to 0.02 mm.

6. A hydride storage according to claim 3, wherein said metallic fabric is made from a steel wire having a diameter of up to 0.04 mm.

7. A hydride storage according to claim 6, wherein said metallic fabric is a braid fabric.

8. A hydride storage according to claim 1 wherein said fabric meterial in the form of a tube comprises a tubular conduit extending into said storage material, said space defined centrally in said storage material with storage material around said space.

9. A hydride storage for hydrogen according to claim 8, wherein said tubular conduit extends into said connection and including a bushing in said connection engaged around said conduit.

10. A hydride storage according to claim 9, wherein said conduit is welded into said bushing.

11. A hydride storage according to claim 9, wherein said bushing and said filter are fitted into said external connection.

12. A hydride storage according to claim 9 wherein said storage material has an outer circumferential surface in contact with an inner surface of said rigid tubular housing.

13. A hydride storage according to claim 12 wherein said fabric material comprises a metallic fabric made from stainless steel wire having a diameter up to 0.04 mm, said metallic fabric having a mesh size of between 0.01 and 0.02 mm.

14. A hydride storage according to claim 1 wherein said flexible fabric material extends around said storage material and said space is defined between said flexible fabric material and said rigid tubular housing.

15. A hydride storage according to claim 14 wherein said fabric material comprises metallic fabric made of stainless steel wire having a diameter of up to 0.04 mm, said metallic fabric having a mesh size of 0.01 to 0.02 mm.

16. A hydride storage according to claim 14 including a baffle plate connected to said fabric material tube for separating said storage material from said space at one axial end of said space, a bushing connected to said bore and engaged with said baffle plate, said bushing having a plurality of slots for communicating said bore with said space.

17. A hydride storage according to claim 14 including a second fabric material tube extending into said storage material and defining a second space extending axially in said storage material said second space communicating with said bore.

18. A hydride storage according to claim 17 including a bushing connected to said external connection and connected to said first mentioned fabric material, said second fabric material extending into said bushing, said bushing having a plurality of holes therein communicating said bore with said first mentioned space.

* * * * *